(12) United States Patent
Chatterjee et al.

(10) Patent No.: US 12,488,054 B2
(45) Date of Patent: Dec. 2, 2025

(54) CONTENT SEARCH BASED ON CORRELATING A USER PROPENSITY WITH PROPENSITY OF CONTENT PROVIDERS

(71) Applicant: International Business Machines Corporation, Armonk, NY (US)

(72) Inventors: Charbak Chatterjee, West Bengal (IN); Vijay Kumar Ananthapur Bache, Karnataka (IN); Saon Sen Nandi, West Bengal (IN); Narendra Kunte, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/468,978

(22) Filed: Sep. 18, 2023

(65) Prior Publication Data

US 2025/0094501 A1    Mar. 20, 2025

(51) Int. Cl.
*G06F 16/00* (2019.01)
*G06F 16/906* (2019.01)
*G06F 16/953* (2019.01)

(52) U.S. Cl.
CPC .......... *G06F 16/906* (2019.01); *G06F 16/953* (2019.01)

(58) Field of Classification Search
CPC .............................. G06F 16/906; G06F 16/953
See application file for complete search history.

(56) References Cited

U.S. PATENT DOCUMENTS

| 10,423,651 | B2 | 9/2019 | Singh | |
|---|---|---|---|---|
| 2014/0258309 | A1 | 9/2014 | Young | |
| 2016/0189173 | A1* | 6/2016 | King | G06Q 30/0201 705/7.29 |
| 2016/0283497 | A1* | 9/2016 | Singh | G06F 16/35 |
| 2016/0292600 | A1 | 10/2016 | Alex et al. | |
| 2018/0121970 | A1 | 5/2018 | Berry et al. | |
| 2018/0150890 | A1* | 5/2018 | Gupta | G06N 5/02 |
| 2019/0073410 | A1* | 3/2019 | Booker | G06F 16/355 |
| 2019/0287143 | A1 | 9/2019 | Flores et al. | |
| 2020/0349274 | A1 | 11/2020 | Miller et al. | |
| 2021/0117417 | A1 | 4/2021 | Hendrickson et al. | |
| 2022/0114626 | A1 | 4/2022 | Lavasanijou et al. | |
| 2023/0177354 | A1 | 6/2023 | Daley et al. | |

FOREIGN PATENT DOCUMENTS

CN    110134770 A    *    8/2019

OTHER PUBLICATIONS

Disclosed Anonymously, "Method for Dynamic Content Augmentation with Feedback Comments", IP.com Prior Art Database Technical Disclosure; IPCOM000263119D; Jul. 30, 2020, 5 pages.

* cited by examiner

*Primary Examiner* — Dinku W Gebresenbet
(74) *Attorney, Agent, or Firm* — CHIP LAW GROUP

(57) ABSTRACT

Content providers are clustered based on attributes of the content providers to produce a plurality of clusters each having content providers with aligned attributes. A correlation between a user providing a search query and the clusters is determined based on attributes of the user relative to attributes of the clusters. A cluster from among the plurality of clusters is determined based on the correlation. Content satisfying the search query is retrieved from the content providers of the determined cluster.

17 Claims, 7 Drawing Sheets

260

| Reader | Review Cluster | NextIntent | Cluster Review Propensity | Correlation strength | Escape time |
|---|---|---|---|---|---|
| Usr₁ | UC₁ | buy product1 | .68 | High | 2day |
| Usr₁ | UC₁ | buy product2 | .72 | Medium | 4day |
| Usr₁ | UC₂ | Consumable | .42 | Low | 1day |

Reader-ReviewCluster

275

| Review Cluster | Density | Domain | Propensity Index | Escape time |
|---|---|---|---|---|
| UC₁ | 20K | Electronics | .68 | 2.8yr |
| UC₂ | 8K | Consumable | .72 | 3yr |

ReviewCluster

FIG. 2B $$CS = \Sigma \; (RelIndx(RInt_i) * RelIndx(ReV_i)) + ... + (RelIndx(RInt_n) * RelIndx(ReV_n))$$

410 ⇒

| RC | CONTROL DIM | REVIEW EVENT | RELIABILITY INDEX |
|---|---|---|---|
| RC I | JOB JUNCTION | $Ev_1$ | $Idx_1$ |
| RC II | ENGAGEMENT | $Ev_2$ | $Idx_2$ |
| RC III | BENEFIT | $Ev_3$ | $Idx_3$ |

420 ⇒

| RC | CONTROL DIM | REVIEW EVENT | RELIABILITY INDEX |
|---|---|---|---|
| RC I | JOB JUNCTION | Ev[1] | $Lst_1$ |
| RC II | ENGAGEMENT | Ev[2] | $Lst_2$ |
| RC III | BENEFIT | Ev[n] | $Lst_3$ |

FIG. 4

CONTENT SEARCH BASED ON CORRELATING A USER PROPENSITY WITH PROPENSITY OF CONTENT PROVIDERS

BACKGROUND

1. Technical Field

Present invention embodiments relate to search engines, and more specifically, to retrieving content for a user by correlating the user with content providers based on propensities of the user and content providers.

2. Discussion of the Related Art

Users are constantly looking for reliable and meaningful feedback (or reviews) for a desired item (e.g., during purchase of a product or service). However, the feedback (or reviews) are partially meaningful to users since the reviews are unable to establish a reliability or usefulness from a perspective of the users. In other words, the reviews fail to establish a correlation with user characteristics.

Products or services may be purchased either online or offline. However, readers (as buyers or consumers) are exposed to feedback (or reviews) from all reviewers based on review attributes, such as verified purchaser, expert reviewer, high rating, helpful count, etc., irrespective of a reviewer expertise or co-affinity with a reader profile. Thus, the feedback (or reviews) may not be harmonized with the reader affinity towards certain viewpoints. This leads to a poor user experience and incorrect or misalignment of relevance for the user seeking contextual feedback (or reviews) before making a decision about a product or service.

SUMMARY

According to one embodiment of the present invention, a system for processing a search query comprises one or more memories and at least one processor coupled to the one or more memories. The system clusters content providers based on attributes of the content providers to produce a plurality of clusters each having content providers with aligned attributes. A correlation between a user providing the search query and the clusters is determined based on attributes of the user relative to attributes of the clusters. A cluster from among the plurality of clusters is determined based on the correlation. Content satisfying the search query is retrieved from the content providers of the determined cluster. Embodiments of the present invention further include a method and computer program product for processing a search query in substantially the same manner described above.

BRIEF DESCRIPTION OF THE DRAWINGS

Generally, like reference numerals in the various figures are utilized to designate like components.

FIG. 2B is a block diagram of cluster data for correlating content providers with users according to an embodiment of the present invention.

FIG. 4 is an illustration of determining a correlation strength between content providers and users according to an embodiment of the present invention.

DETAILED DESCRIPTION

Figure 1:
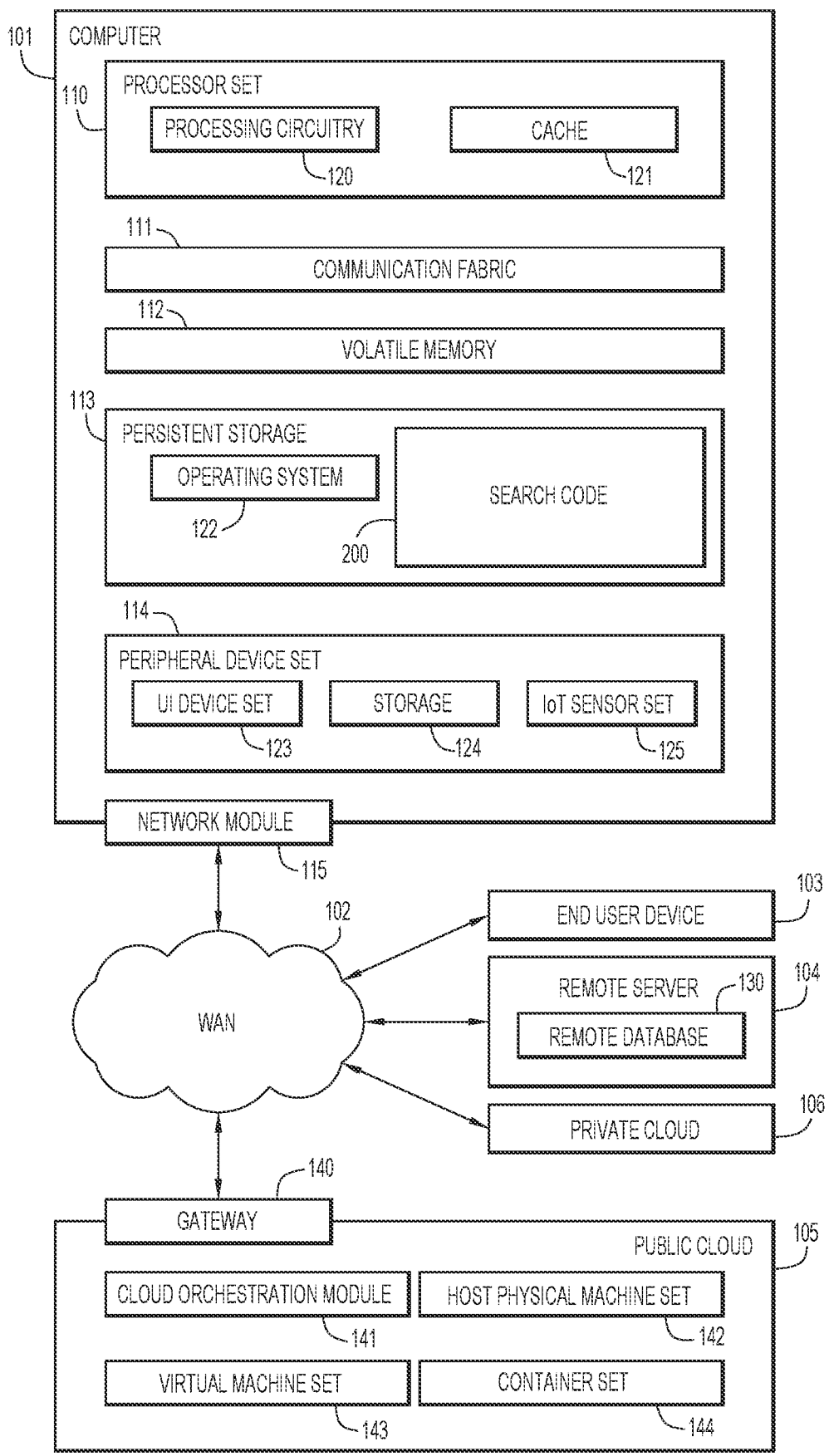
FIG. 1 is a diagrammatic illustration of an example computing environment according to an embodiment of the present invention.

Users are constantly looking for reliable and meaningful feedback (or reviews) for a desired item (e.g., during purchase of a product or service). However, the feedback (or reviews) are partially meaningful to users since the reviews are unable to establish a reliability or usefulness from a perspective of the users. In other words, the reviews fail to establish a correlation with user characteristics. Further, the feedback (or reviews) may not be harmonized with the reader affinity towards certain viewpoints. This leads to a poor user experience and incorrect or misalignment of relevance for the user seeking contextual feedback (or reviews) before making a decision about a product or service.

For example, reviewers may work with fast-moving consumer goods (FMCG) and have knowledge of different products (e.g., automotive products, etc.). These types of goods typically sell quickly (e.g., short shelf-life due to demand, etc.) and have low cost. The reviewers may publish product reviews on an online platform. Users looking for a reliable review prior to purchasing a cleaning product may include knowledgeable individuals with a strong industry background and novice individuals that lack subject matter expertise or experience.

In this example scenario, the knowledgeable and novice readers are provided with reviews from various types of reviewers based on reviewer attributes, such as verified purchaser, expert reviewer, high rating, helpful count, etc. However, a reader may be more interested to read reviews from reviewers that belong a same group as the reader (e.g., based on user characteristics, etc.) or from reviewers that have similar propensity relative to members of the group. For example, a review may not be relevant to a reader when the reviewer knowledge or expertise is significantly greater than that of the reader.

Although reviews may be provided based on various review criteria (e.g., most relevant, highly rated, or any other filtering criteria), the review is not identified based on being from a reviewer in a similar user group of the reader. In other words, a search for a relevant review does not consider criteria of affinity grouping between reviewers and the reader. Thus, reviews from like-minded persons are missed, thereby lacking a personalized user experience.

Accordingly, an embodiment of the present invention searches content (e.g., feedback, reviews, etc.) for a user (or reader) by correlating the user with content providers (e.g., reviewers, etc.) based on propensity or other attributes (e.g., inclination, tendencies, characteristics, trust, fairness, self-awareness, motivation, expertise, etc.) of the user and content providers. The content providers are clustered based on various attributes, and a content provider cluster is identified based on similarity of user attributes to cluster attributes. Content satisfying search criteria and from content providers of the identified cluster is retrieved to provide search results that are relevant and meaningful to the user (since the content is from like-minded individuals).

An embodiment of the present invention identifies feedback (or reviews) based on a reviewer group (or cluster) affinity and propensity of readers. Propensity or affinity information is derived from digital footprints for both the reader and reviewers. A reader profile of individuals can be derived based on a digital footprint, thereby enabling an affinity towards a review cluster to be ascertained. The present invention embodiment generates a cluster of reviewers (or review cluster) based on affinity or propensity dimensions (e.g., trust, fairness, self-awareness, motivation, expertise, intent, etc.) maintained at a review cluster level and anonymized. The affinity or propensity dimensions of reviewers are aligned with associated affinity or propensity dimensions from reader profiles (e.g., expertise, event, intent, trust, fairness, self-awareness, motivation, etc.) in order to correlate a reader with reviewers and their corresponding reviews. Since market penetration with a new product or service is a major challenge for any company, an esteemed consortium of clustered reviewers derived by the present invention embodiment provides a set of customers who can provide candid feedback (or reviews) of the newly launched product or service to reinforce potential market share.

An embodiment of the present invention measures, predicts, and simulates an impact on a reviewer group (or cluster) constructed on a basis of a group correlation strength before and after occurrence of a review in close proximity (e.g., time and space) to the review cluster. The present invention embodiment generates a new review cluster via a machine learning model. The review cluster is maintained in an anonymized manner. The review cluster contains a plurality of reviewers with similar attributes or characteristics (e.g., expertise, ranking, etc.) to correlate with a reader profile. The affinity or propensity of readers derived from reader profiles is correlated with the review cluster based on various criteria (e.g., reliability, cluster overall maturity/expertise ranking with reader maturity/expertise ranking, etc.). Thus, the present invention embodiment identifies content more contextually relevant, trustworthy, and meaningful to a reader in a comprehensive manner.

An embodiment of the present invention may harvest data over time from varied sources (e.g., social media, institutional data segmented and contextualized on concept, transactional data, cluster activity, etc.). This information may be part of a data lake containing an astatic information model or source to core approach. The present invention embodiment generates a propensity cluster (or review cluster) using inclination dimensions as control variables to optimize a critical density (e.g., based on a user base, activity thread, etc.) and propensity index (domain in consideration) of the cluster. A reliability index, correlation strength, and escape time are determined for a domain or subject area, and review and feedback are assessed with respect to a plurality of cluster interactions and review event occurrences. The present invention embodiment employs intelligence to help users leverage review or rating metrics based on individual persona in view of affinities or propensities of a plurality of review clusters. Further, relevant reviews and questionnaires may be dynamically generated.

For example, a first user (user1) may have good insight in a specific area having plural dimensions or attributes. User1 may receive a review comment or rating provided by a reviewer group (G1) with members having similar insight on a dimension of the specific area and correlating with a profile of user1. User1 may belong to a user group that has a propensity among group members for another dimension of the subject area. The present invention embodiment generates a domain specific cluster with optimum cardinality to produce target influencing events. The present invention embodiment may predict an escape time (e.g., time interval or duration) for which a review impact remains active without any other event occurring in proximity of the cluster. The escape time may be determined based on historical data of changes to cluster reliability from new events. The events may include any event that influences a perspective of a reviewer (e.g., social event, change in job or role, market dynamics, etc.).

An embodiment of the present invention generates a review cluster of anonymized individuals having the same or similar affinities using dimensions or attributes maintained at a cluster profile level (e.g., based on profiles of the reviewers) as a control variable via a critical density. The cardinality of the cluster is optimized with respect to a reader in accordance with a reliability index and a correlation strength for subject area cohesion to identify relevant reviews/feedback to the reader. In other words, the reader has a high correlation strength with the review cluster (or review cluster members) in order to identify reviews highly relevant for the reader.

An embodiment of the present invention may dynamically generate review questions based on a reader and a review cluster profile by adding a novel dimension propensity index in a plurality of attributes that signifies reliability coherence between a profile within the cluster and a review context. The reliability relevance may be reviewed to re-construct the cluster for endured escape time in a plurality of services, thereby offering a maturity model and user objective for a subject area in scope. For example, the present invention embodiment may monitor disparities between the reader and review cluster over time and generate review questions relative to an intent of the reader to compensate for the disparities.

An embodiment of the present invention may generate a domain specific feedback (or review) cluster with optimum cardinality and produce target reliable review events from the cluster. The present invention embodiment may predict an escape time (e.g., time interval or duration) for which a review impact remains active without any other event happening in proximity of the cluster. The escape time may be determined based on historical data of changes to cluster reliability from new events. The events may include any event that influences a perspective of a reviewer (e.g., social event, change in job or role, market dynamics, etc.).

An embodiment of the present invention may place a reader into a relevant cluster, while maintaining cluster relevancy in a plurality of subject areas.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as search code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
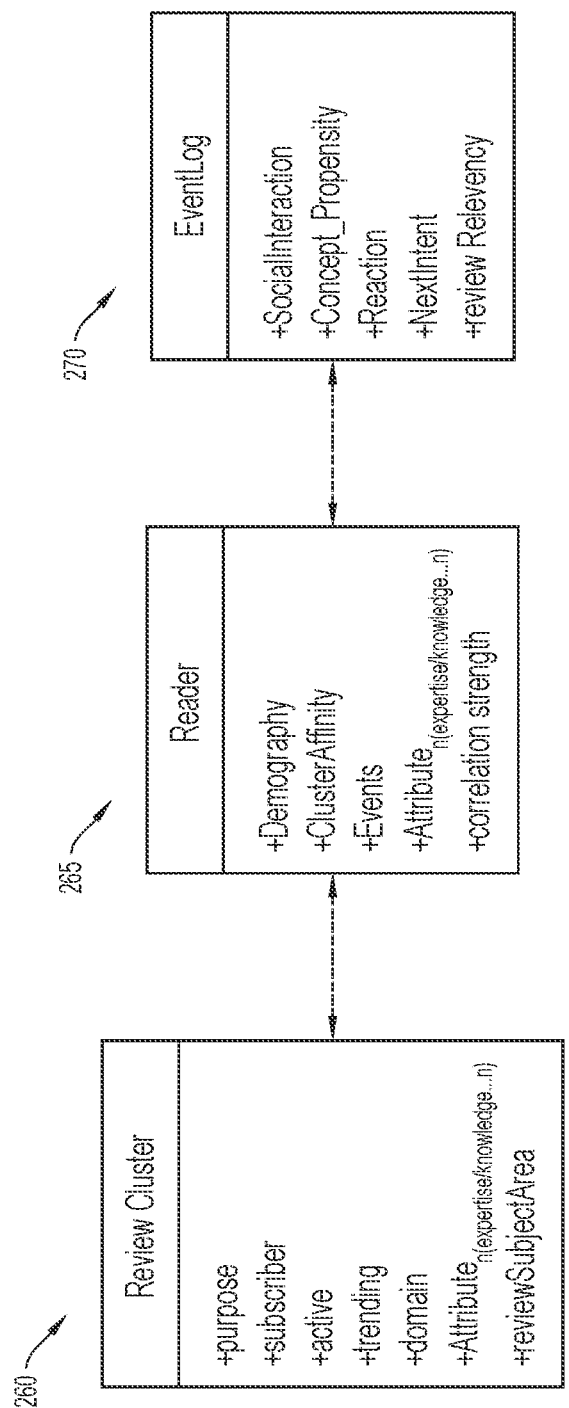
FIG. 2A is a block diagram of data entities used for correlating content providers with users according to an embodiment of the present invention.
Figure 2C:
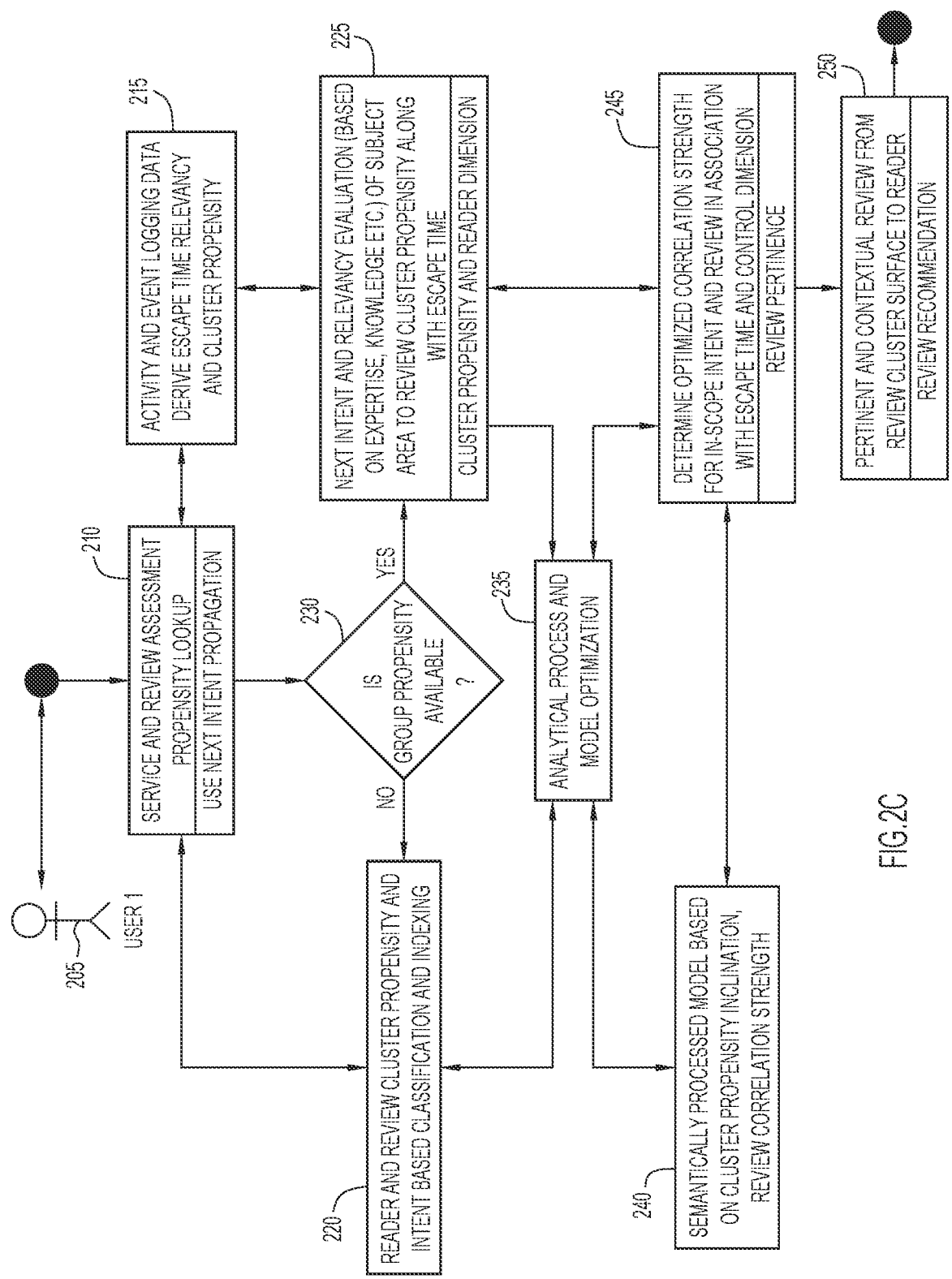
FIG. 2C is a procedural flowchart illustrating a manner of retrieving content for a user according to an embodiment of the present invention.

A method 200 of retrieving content for a user (e.g., via computer 101 and search code 200, etc.) according to an embodiment of the present invention is illustrated in FIGS. 2A-2C. By way of example, method 200 (FIG. 2C) is described with respect to content including feedback or reviews (e.g., of products and/or services, etc.) provided by content providers in the form of reviewers. However, any content (e.g., documents, web sites, blogs, threads, communications, etc.) from any content source (e.g., person, organizational entity, software or device, etc.) may be identified and retrieved in substantially the same manner described below.

A user or reader 205 provides a search query including one or more search terms for search code 200 to retrieve content (e.g., feedback, reviews, etc.) for a product or service from content providers (e.g., reviewers, etc.). The reader may be associated with reader data 265 (FIG. 2A) including a demography, cluster affinity, events, attributes (e.g., expertise, knowledge, etc.) and a correlation strength for a review cluster. Search code 200 processes criteria for a list of products and services, and performs a lookup of an assessment propensity at operation 210. Search code 200 logs activity and event data to derive an escape time, relevancy, and a cluster propensity at operation 215. The event logging may be associated with event log data 270 (FIG. 2A) including events and information, such as social interactions, concept propensity, reaction, intent, and review relevancy. The events may include any event that influences a perspective of a reviewer (e.g., social event, change in job or role, market dynamics, etc.). This information is used to process the criteria for products and services and perform the lookup.

When a group (or cluster) propensity is not available (e.g., fails to satisfy a threshold, etc.) as determined at operation 230, search code 200 performs a reader and review cluster propensity and intent based classification and indexing at operation 220. For example, search code 200 clusters reviewers based on reviewer data. Review clusters may be associated with review cluster data 260 (FIG. 2A) including purpose, subscriber, active, trending, domain, attributes (e.g., expertise, knowledge, etc.), and subject area. The clustering may be performed in substantially the same manner described below, and may employ any conventional or other clustering techniques (e.g., k-means clustering, hierarchical clustering, etc.) using any quantity of any features. The cluster analysis identifies common features of the reviewers and/or reviews, and determines results based on the presence or absence of the features in data for the reviewers and/or reviews. A machine learning model may cluster the reviewers in a feature space (of reviewer features) by processing the reviewer attributes or features. The formed clusters are each associated with reviewers having aligned or similar attributes (e.g., propensity or affinity, etc. within a certain tolerance). For example, the clusters may each be associated with like-minded reviewers. Different features may form reference points for forming the clusters. The machine learning model may be implemented by any conventional or other machine learning models (e.g., mathematical/statistical models, classifiers, feed-forward, recurrent or other neural networks, etc.).

In addition, search code 200 classifies the reader into a category corresponding to a perspective, context, and/or intent of the reader. The classification may be performed in substantially the same manner described below. The classification may employ any conventional or other classification techniques (e.g., k-nearest neighbor (k-NN), etc.), and use any quantity of any features. A machine learning model may classify reader 205 into a category corresponding to a perspective, context, and/or intent of the reader. The category is used to map user 205 to a review cluster. The machine learning model may be implemented by any conventional or other machine learning models (e.g., mathematical/statistical models, classifiers, random forest, feed-forward, recurrent or other neural networks, etc.).

In addition, search code 200 may annotate reviews and surveys with a propensity of a corresponding review cluster and derive a reliability index for a review cluster based on an escape time for reviews, subject area expertise of cluster members, trust of cluster members, fairness of cluster members, self-awareness of cluster members, etc. These attributes may be derived from profiles of the reviewers based on any conventional or other natural language processing (NLP) techniques. Further, search code 200 may annotate the reader and a review cluster with reviews over the criteria.

The above process is repeated from operation 210 (e.g., including modification of the clustering) until a cluster propensity is available (e.g., satisfies a threshold, etc.). When the cluster propensity is available (e.g., satisfies a threshold, etc.) as determined at operation 230, search code 200 determines at operation 225 a reader correlation strength with a review cluster, a next intent based on the classification, a relevancy of a subject area (e.g., based on reader expertise, knowledge, etc.) to the cluster propensity, and an escape time. The escape time may be determined based on historical data of changes to cluster reliability from new events. The events may include any event that influences a perspective of a reviewer (e.g., social event, change in job or role, market dynamics, etc.).

In other words, code 200 generates review cluster information 275 (FIG. 2B) and review cluster correlation data 280 (FIG. 2B) that are used to identify a review cluster from which to retrieve reviews for user 205. Review cluster information 275 may be represented in the form a table with each row corresponding to a review cluster and including a review cluster identifier, a density (e.g. quantity of members), a subject area or domain, a propensity index (e.g., indicating similarity of attributes of cluster members based on Euclidean or other distances, cosine similarity, etc.), and an escape time. Review cluster correlation data 280 may be represented in the form a table with each row corresponding to a reader and including a reader identifier, a review cluster identifier, an intent of the reader, a propensity index (e.g., indicating similarity of attributes of cluster members based on Euclidean or other distances, cosine similarity, etc.), a correlation strength between the reader and review cluster, and an escape time.

Search code 200 develops a semantically processed model based on review cluster reliability coherence and correlation strength of the reader at operations 235 and 240. The model produces a recommendation for a review cluster from which to retrieve reviews satisfying the search query from user 205. Further, the intent may be examined for the recommendation. In this case, natural language processing (NLP) techniques (e.g., semantic analysis, etc.) may be performed on a reader profile to determine reader intents. The NLP techniques (and classification) produce concepts within an ontology that correspond to the intents. A similarity score is determined based on distances between concepts (or intents) of the reader and the review clusters within an ontology. When plural concepts or intents are present for the reader, the intents may be merged or separated based on distance thresholds (for corresponding concepts within the ontology), and the reader intent closest to a cluster intent may be used as the reader intent for the recommendation.

Search code 200 determines an optimized correlation strength of the user for in-scope intent and review (or review generation) in association with escape time and other control dimensions or attributes at operation 245. The model is employed to identify a review cluster for the reader based on review cluster information 275 and review cluster correlation data 280.

Search code 200 retrieves pertinent and contextual reviews from the identified review cluster satisfying the search query at operation 250, and presents or displays the results to user 205 on a user device (e.g., end user device 103).

Figure 3A:
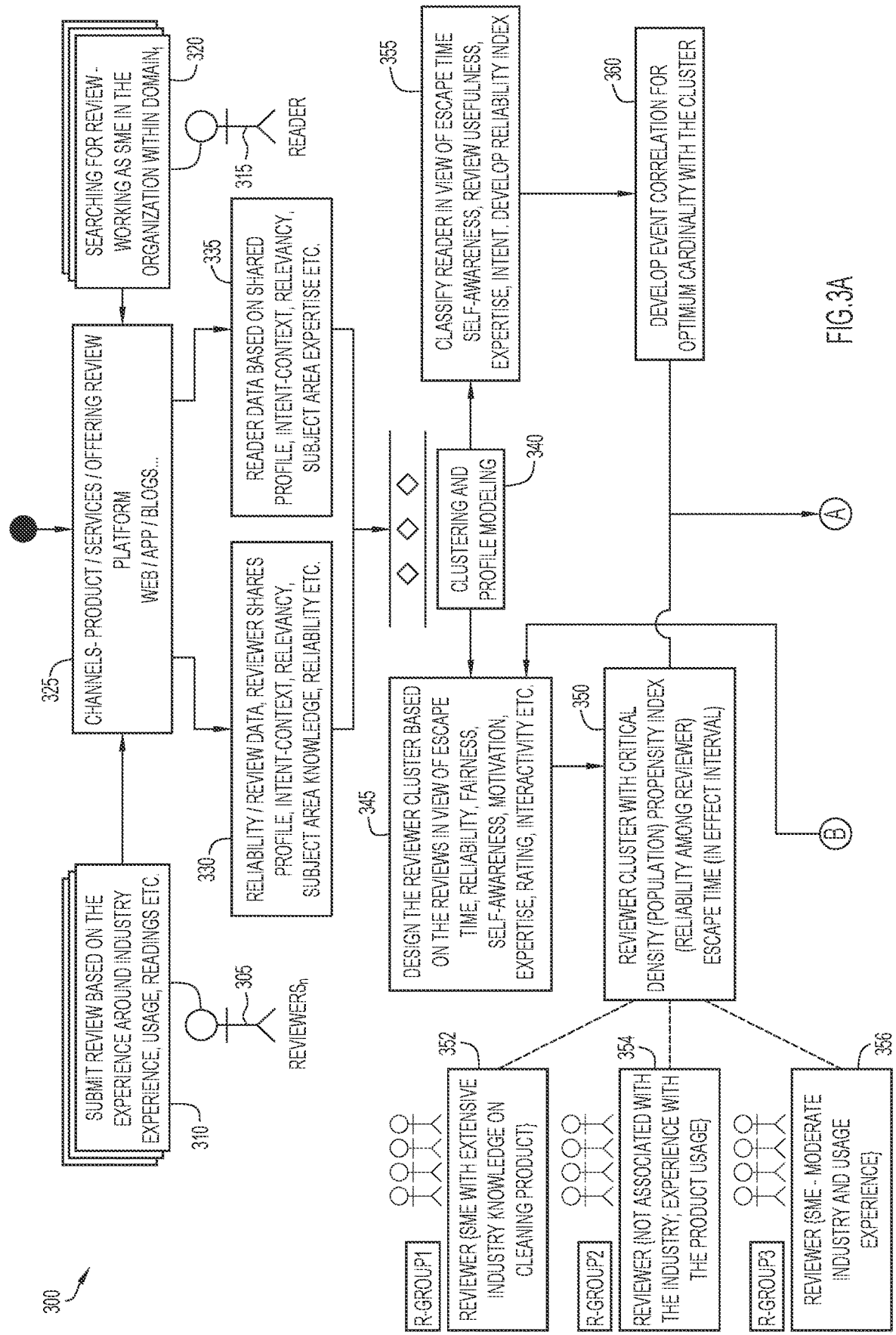
FIGS. 3A-3B are a procedural flowchart illustrating a manner of correlating content providers with a user to retrieve relevant content for the user according to an embodiment of the present invention.
Figure 3B:
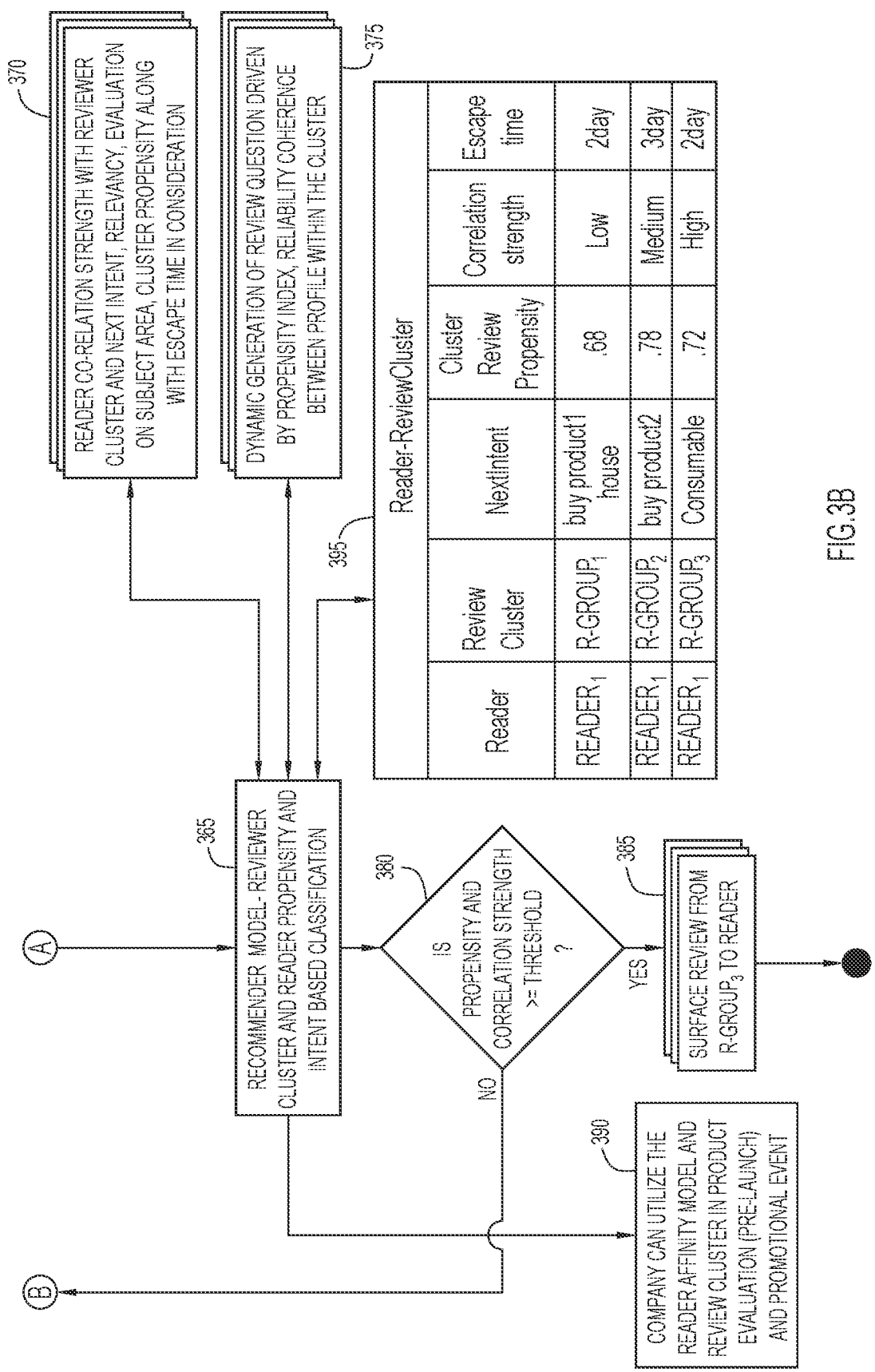

A method 300 of correlating content providers with a user to retrieve relevant content for the user (e.g., via computer 101 and search code 200, etc.) according to an embodiment of the present invention is illustrated in FIGS. 3A-3B. By way of example, method 300 is described with respect to content including feedback or reviews (e.g., of products and/or services) provided by content providers in the form of reviewers. However, any content (e.g., documents, web sites, blogs, threads, communications, etc.) from any content source (e.g., person, organizational entity, software or device, etc.) may be identified and retrieved in substantially the same manner described below.

Initially, search code 200 collects data 330 for content providers (or reviewers) 305 and data 335 for a user (or reader) 315. Reviewers 305 may provide reviews 310 on products or services based on various attributes (e.g., experience in relevant industry, usage of product or service, readings, etc.). The reviews may be provided to various content sources 325 (e.g., product or service channels, review platforms, web sites, applications, blogs, etc.). Reader 315 may search for a review for a product or service, and may be associated with a user profile derived from content (e.g., user information, posts, messages, etc.) on one or more of content sources 325. The user profile may include various attributes or information of the reader (e.g., subject matter expertise, work experience, inclinations, tendencies, propensity, affinity, etc.). Reviewers 315 may similarly be associated with profiles including various attributes or information of the reviewers (e.g., subject matter expertise, work experience, inclinations, tendencies, propensity, affinity, etc.) derived from content (e.g., reviewer information, posts, messages, etc.) on one or more of content sources 325. Reviewer data 330 may be derived from the reviewer profiles using any conventional or other natural language processing techniques (e.g., entity recognition, relationship discovery, semantic analysis, etc.) and include intent context, relevancy, subject area knowledge, reliability, etc. User data 335 may be derived from the user profile using any conventional or other natural language processing techniques (e.g., entity recognition, relationship discovery, semantic analysis, etc.) and include intent context, relevancy, subject matter expertise, etc.

Search code 200 clusters the reviewers based on reviewer data 330 and classifies the user within a category based on user data 335 at operation 340. For example, search code 200 generates review clusters based on reviewers and/or reviews in view of various attributes (e.g., escape time, reliability, fairness, self-awareness, motivation, expertise, rating, interactivity, intent, etc.). These attributes may be derived from reviewer data 330 using any conventional or other natural language processing techniques (e.g., entity recognition, relationship discovery, semantic analysis, etc.).

The clustering may employ any conventional or other clustering techniques (e.g., k-means clustering, hierarchical clustering, etc.), and use any quantity of any features or attributes. The cluster analysis identifies common features of the reviewers and/or reviews, and determines results based on the presence or absence of the features in data for the reviewers and/or reviews.

A machine learning model may cluster the reviewers and/or reviews in a feature space (of reviewer and/or review features) by processing the reviewer and/or review attributes or features. The formed clusters are each associated with reviewers having aligned or similar attributes (e.g., propensity or affinity, etc. within a certain tolerance). For example, the clusters may each be associated with like-minded reviewers. Different features may form reference points for forming the clusters.

The machine learning model may be implemented by any conventional or other machine learning models (e.g., mathematical/statistical models, classifiers, feed-forward, recurrent or other neural networks, etc.). For example, neural networks may include an input layer, one or more intermediate layers (e.g., including any hidden layers), and an output layer. Each layer includes one or more neurons, where the input layer neurons receive input (e.g., feature vectors), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, a machine learning model may be trained with a training set of features, where the neural network attempts to produce the provided or known data and uses an error from the output (e.g., difference between inputs and outputs) to adjust weight (and bias) values. The output layer of the neural network indicates a cluster for input data. By way of example, the output layer neurons may indicate a specific cluster or an identifier of the specific cluster (and a probability or confidence). Further, output layer neurons may be associated with different clusters and indicate a probability (or confidence) of the input data belonging to the associated cluster. The cluster associated with the highest probability is preferably selected for the input data.

The machine learning model may be trained with data of various reviewers and/or reviews with known clusters or classifications. The reviewer and/or review data is provided to the machine learning model to produce the review clusters.

Search code 200 creates review clusters associated with a critical density (e.g., certain distance between reviewer attributes, etc.), a propensity index (e.g., reliability or similarity among reviewers), and an escape time (e.g., a time interval or duration for which a review remains active) at operation 350. The propensity index may be based on the confidence values of cluster members from the machine learning model, and/or similarity metrics among attributes of members in the cluster (e.g., Euclidean or other distances, cosine similarity, etc.). For example, the review clusters may include a review cluster 352 with reviewers having subject matter experts (SME) with extensive industry knowledge of a product or service (e.g., a cleaning product, etc.), a review cluster 354 with reviewers unassociated with a corresponding industry but having experience with usage of the product or service, and a review cluster 356 with reviewers having moderate industry and usage experience associated with the product or service.

Search code 200 further classifies reader 315 into a category corresponding to a perspective, context, and/or intent of the reader at operation 340. The category is used to map the reader to a review cluster. The clustering of reviewers and classification of the reader may be performed in parallel. For example, search code 200 classifies reader 315 based on various attributes (e.g., escape time, self-awareness, review usefulness, expertise, intent, trust, fairness, motivation, etc.) at operation 355. A reliability index for the review clusters is also determined as described below. The classification may employ any conventional or other classification techniques (e.g., k-nearest neighbor (k-NN), etc.), and use any quantity of any features.

A machine learning model may classify reader 315 into a category corresponding to a perspective, context, and/or intent of the reader. The category is used to map the reader to a review cluster. The machine learning model may be implemented by any conventional or other machine learning models (e.g., mathematical/statistical models, classifiers, random forest, feed-forward, recurrent or other neural networks, etc.). For example, a neural network substantially similar to the neural network described above may be employed to perform the classification. In this case, the output layer of the neural network indicates a classification for input data. By way of example, the output layer neurons may indicate a specific classification (or category) or an identifier of the specific classification (and a probability or confidence). Further, output layer neurons may be associated with different classifications and indicate a probability (or confidence) of the input data belonging to the associated classification. The classification associated with the highest probability is preferably selected for the input data.

The machine learning model may be trained with data of various users with known classifications. The user data is provided to the machine learning model to produce the classification or category which is used to map reader 315 to a review cluster. Thus, the resulting classification may be used to determine a corresponding review cluster for reader 315.

Search code 200 determines an event correlation for optimum cardinality with the review clusters at operation 360. Referring to FIG. 4, a time window or interval, $t_n$, is identified in which a complex sequence of review events ReV is captured. The time window may correspond to be within an escape time. The events may include any event that influences a perspective of a reviewer (e.g., social event, change in job or role, market dynamics, etc.). Event reliability data 410 may be represented as a table with each row corresponding to an event (e.g., any event that influences a perspective of a reviewer, such as a social event, change in job or role, market dynamics, review, etc.) and including a review cluster identifier (RC[i]), a control variable (or dimension or attribute), a review event identifier, and a reliability index for the review cluster. Event correlation data 420 may be represented as a table with each row corresponding to an event (e.g., any event that influences a perspective of a reviewer, such as a social event, change in job or role, market dynamics, review, etc.) and including a review cluster identifier (RC[i]), a control variable (or dimension or attribute), a review event identifier, and a correlation strength.

The correlation strength (CS) may be determined based on a summation of the product of the reliability index (e.g., RelIndx as viewed in FIG. 4) for a review intent (RInt as viewed in FIG. 4) and a reliability index for a review event (ReV as viewed in FIG. 4) for each dimension or attribute (or control variable from 1 to n). For example, the correlation strength (CS) may be expressed as:

$$CS = \Sigma (RelIndx(RInt_1)*RelIndx(ReV_1) + \ldots + (RelIndx(RInt_n)*RelIndx(ReV_n)).$$

The control variable may be any attribute or variable associated with the cluster that may affect reliability of the review cluster. The reliability index represents a reliability or confidence of the review cluster. Since the review clusters are dynamically changing in response to various events (e.g., a social event, change in job or role, market dynamics, review, etc.), the reliability index is based on an amount of change of one or more attributes of the review cluster (e.g., population, member confidences, propensity or propensity index, etc.) in response to certain conditions. For example, the reliability index may be based on the confidence values of cluster members from the machine learning model, and/or similarity metrics among attributes of members in the cluster (e.g., Euclidean or other distances, cosine similarity, etc.). The reliability index for a review intent represents the reliability of members of a review cluster corresponding with that review intent, while the reliability index for a review event represents the reliability of members of a review cluster based on the review event. The reliability index for the review event may further represent a probability of a next review occurring within an optimum time window that can change the reliability index for the review event by a minimum critical density or threshold.

The value of the correlation strength at the onset of review events is extrapolated from a reliability index initially derived based on a propensity inclination (or propensity index) for control dimensions of the review cluster.

The authoritative cardinality of a review comment with a reliability index within a critical density or threshold distance of the reliability index of the review intent provides an optimum review cluster design. When the reliability index of the review comment is not within a critical density level of a reliability index for a review intent for a target dimension, this has a negative influence on the review comment and the correlation strength is determined based on a combination of positive and negative reliability indexes for a targeted review event.

The correlation strength of a cluster before impact (or within the escape time) is measured as described above. However, after impact (or expiration of the escape time), the correlation strength is measured based on a strength of reliability and meaningfulness of recorded feedback.

Referring back to FIG. 3B, search code 200 analyzes attributes of the review clusters and reader 315 to recommend a review cluster for retrieving content for the reader at operation 365. For example, a recommender model may be used to recommend a review cluster, and may employ any conventional or other validation techniques (e.g., K-fold cross validation, etc.). The recommender model may be implemented by any conventional or other model (e.g., mathematical/statistical, rules-based, machine learning model as described above, etc.). For example, search code 200 may generate correlation data 395 for reader 315 and each review cluster based on the clustering and classification. The correlation data may be represented as a table or other data structure. By way of example, correlation data 395 may include a row for each review cluster indicating a reader identifier, a review cluster identifier, an intent, a cluster propensity index, a correlation strength, and an escape time.

The recommender model of search code 200 may analyze correlation data 395 and various other data (e.g., correlation strength, intent, relevancy evaluation on subject area, cluster propensity, reader classification or category, intent, etc.) at operation 370 to provide a recommended review cluster. For example, the recommender model may recommend review cluster 356 based on a high correlation strength between the reader and that review cluster and the relatively high propensity index.

Further, the intent may be examined for the recommendation. In this case, natural language processing (NLP) techniques (e.g., semantic analysis, etc.) may be performed on the reader profile to determine reader intents. The NLP techniques (and classification) produce concepts within an ontology that correspond to the intents. A similarity score is determined based on distances between concepts (or intents) of the reader and the review clusters within an ontology. When plural concepts or intents are present for the reader, the intents may be merged or separated based on distance thresholds (for corresponding concepts within the ontology), and the reader intent closest to a cluster intent may be used as the reader intent for the recommendation.

Further, search code 200 may dynamically generate review questions for reviewers at operation 375 based on a propensity index of a review cluster and reliability coherence between profiles of cluster members. The questions may be generated using any conventional or other natural language processing (NLP) and/or generative artificial intelligence (AI) techniques. For example, search code 200 may monitor disparities between the reader and review cluster over time and generate review questions relative to an intent of the reader to compensate for the disparities.

Search code 200 validates the recommended review cluster at operation 380. For example, search code 200 may compare the propensity index and correlation strength for the recommended review cluster to corresponding thresholds. When the recommended review cluster fails to satisfy these thresholds (e.g., are less than or equal to these thresholds, etc.), search code 200 repeats clustering from operation 345 as described above until a validated review cluster satisfying the thresholds is recommended. Hyperparameters of the machine learning model (e.g., weights, structure, training parameters and/or data, etc.) may be adjusted over time to generate clusters aligned with readers.

Once a validated review cluster is produced, reviews satisfying search terms from the reader and provided by members of the review cluster are retrieved and provided to the reader at operation 385 (e.g., on end user device 103, etc.). Further, search code 200 may utilize the reader and review cluster attributes to determine reviewers for evaluation of a product or service (e.g., pre-launch of a product or service, etc.) at operation 390. For example, search code 200 may identify members of review clusters with attributes (e.g., propensity or affinity) similar to a target group to perform the product evaluation. This provides evaluations or reviews meaningful to the target group (e.g., members of a review cluster with minimal expertise or experience may be used for a target group of novice users, etc.).

In addition, search code 200 may add the reader to a relevant review cluster based on closeness of reader attributes to cluster attributes (e.g., Euclidean distance, cosine similarity, etc. exceeding a threshold) at operation 365. The reader may be added while maintaining cluster relevancy of the plurality of subject areas (e.g., maintaining a reliability index for one or more dimensions within a certain range, etc.).

Operation of an embodiment of the present invention with respect to an example scenario is described. In the example scenario, buyer or reader 1 and buyer or reader 2 intend to purchase a particular fast-moving consumer good (FMCG) product (e.g., a household cleaning product). Reader 1 has a background in the FMCG industry, while reader 2 does not have any industry background. Reader 1 and reader 2 are searching for relevant feedback (or reviews) for the particular product before making the purchase.

Further, previous buyers (e.g., reviewer 1, reviewer 2, and reviewer 3) shared their feedback on an online buying platform about the same product. Reviewer 1 has extensive industry experience and product usage knowledge by virtue of being associated with the fast-moving consumer goods (FMCG) industry. Reviewer 2 is not associated with the FMCG industry, but has provided feedback based only on their experience with usage of the product. Reviewer 3 has some knowledge of the product by virtue of their recent entry to work in the FMCG industry and substantial usage experience.

In this example case, an embodiment of the present invention may closely associate reader 1 with reviewer 1 (due to a propensity toward a review cluster) and secondarily associate reader 1 with reviewer 3, thereby providing reviewer 1 with reviews from reviewer 1 and reviewer 3. However, reviews from reviewer 2 are bypassed based on a lesser association with reader 1. The embodiment of the present invention may further determine that reader 2 has more affinity towards a cluster of reviewer 2, and that reader 2 may not require specialized review comments available from reviewer 1. In addition, the present invention embodiment may also display reviews from reviewer 3 as lower priority.

In another example scenario, a company providing fast-moving consumer goods (FMCG) intends to launch a new product in the same product line as the cleaning product in the above-described example scenario. The company may provide some product samples to a particular user cluster produced by a present invention embodiment on product launch. The user cluster may be selected based on a cluster demography to which the new product is targeted. The users of the user cluster (as reviewers) can provide their feedback to influence other prospective buyers (readers) with similar cluster affinity.

Present invention embodiments may provide various technical and other advantages. In an embodiment, the machine learning model may be continuously updated (or trained) based on user feedback, new events, and/or changes in reader and/or reviewer perspective or intent. For example, user feedback, new events, and/or changes in reader and/or reviewer perspective or intent may indicate different criteria for current or new clusters. This information may be used to update or train the machine learning model with new or different training data (e.g., derived from attributes of the information, etc.) to enable dynamic determination of clusters. Thus, the machine learning model may continuously evolve (or be trained) to learn characteristics of readers and/or reviewers for dynamically changing clusters and search results. In addition, the correlation of the user to a review cluster significantly reduces a search space for a search query, thereby improving computer processing speed and response time for processing the query and providing search results with enhanced accuracy and relevancy.

It will be appreciated that the embodiments described above and illustrated in the drawings represent only a few of the many ways of implementing embodiments for content search based on correlating a user propensity with propensity of content providers.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., search code 200, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., search queries, search results, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user (e.g., reviews, etc.).

The present invention embodiments are not limited to the specific tasks or algorithms described above, but may be utilized for searching any content based on correlating users with content providers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing a search query, the method comprising:
    clustering, via at least one processor, a plurality of content providers based on attributes of the plurality of content providers to produce a plurality of clusters, wherein
        each cluster of the plurality of clusters has one or more content providers of the plurality of content providers, and
        the one or more content providers have aligned attributes of the attributes;
    predicting, via the at least one processor, for each cluster of the plurality of clusters, a time interval for which an impact of a review of the one or more content providers remains active, wherein
        the time interval is predicted based on historical data including changes to cluster reliability of a respective cluster of the plurality of clusters from events influencing the attributes of the one or more content providers;
    determining, via the at least one processor, a correlation strength, for each cluster of the plurality of clusters, based on the predicted time interval of the respective cluster and an amount of change to cluster attributes of the respective cluster, wherein
        the cluster attributes are changed based on the events in response to conditions, and
        the determined correlation strength of the respective cluster indicates reliability of the respective cluster;
    determining, via the at least one processor, a correlation between a user profile and each cluster of the plurality of clusters, wherein
        the correlation between the user profile and the respective cluster is determined based on the correlation strength of the respective cluster, attributes of the user profile, and the attributes of the one or more content providers of the respective cluster, and
        the search query is provided by a user associated with the user profile;
    determining, via the at least one processor, a cluster from among the plurality of clusters based on the determined correlation; and
    retrieving, via the at least one processor, content satisfying the search query from the one or more content providers of the determined cluster.

2. The method of claim 1, wherein the content includes reviews for a product or service, and the plurality of content providers includes reviewers of the product or service.

3. The method of claim 2, wherein the attributes of the user profile include one or more from a group of trust, fairness, self-awareness, motivation, expertise, and an intent with respect to the product or service.

4. The method of claim 2, further comprising:
    generating, via the at least one processor, one or more review questions for the reviewers of the determined cluster based on a change in the correlation between the user profile and the determined cluster.

5. The method of claim 1, further comprising:
    re-clustering, via the at least one processor, the plurality of content providers based on reliability of the determined cluster and the correlation of the determined cluster with the user profile failing to satisfy corresponding thresholds.

6. The method of claim 1, further comprising:
    adding, via the at least one processor, the user profile to the determined cluster of the plurality of content providers based on a correlation of the attributes of the user profile to attributes of the determined cluster of the plurality of content providers.

7. A system for processing a search query, the system comprising:
    one or more memories; and
    at least one processor coupled to the one or more memories and configured to:
        cluster a plurality of content providers based on attributes of the plurality of content providers to produce a plurality of clusters, wherein
            each cluster of the plurality of clusters has one or more content providers of the plurality of content providers, and
            the one or more content providers have aligned attributes of the attributes;
        predict, for each cluster of the plurality of clusters, a time interval for which an impact of a review of the one or more content providers remains active, wherein
            the time interval is predicted based on historical data including changes to cluster reliability of a respective cluster of the plurality of clusters from events that influences the attributes of the one or more content providers;
        determine, a correlation strength, for each cluster of the plurality of clusters, based on the predicted time interval of the respective cluster and an amount of change to cluster attributes of the respective cluster, wherein
            the cluster attributes are changed based on the events, and
            the determined correlation strength of the respective cluster indicates reliability of the respective cluster;
        determine a correlation between a user profile and each cluster of the plurality of clusters, wherein
            the correlation between the user profile and the respective cluster is determined based on the correlation strength of the respective cluster, attributes of the user profile, and the attributes of the one or more content providers of the respective cluster, and
            the search query is provided by a user associated with the user profile;
        determine a cluster from among the plurality of clusters based on the determined correlation; and
        retrieve content that satisfies the search query from the one or more content providers of the determined cluster.

8. The system of claim 7, wherein
    the content includes reviews for a product or service and the plurality of content providers includes reviewers of the product or service, and
    the attributes of the user profile include one or more from a group of trust, fairness, self-awareness, motivation, expertise, and an intent with respect to the product or service.

9. The system of claim 8, wherein the at least one processor is further configured to:
    generate one or more review questions for the reviewers of the determined cluster based on a change in the correlation between the user profile and the determined cluster.

10. The system of claim 7, wherein the at least one processor is further configured to:
    re-cluster the plurality of content providers based on reliability of the determined cluster and the correlation of the determined cluster with the user profile failing to satisfy corresponding thresholds.

11. The system of claim 7, wherein the at least one processor is further configured to:
add the user profile to the determined cluster of the plurality of content providers based on a correlation of the attributes of the user profile to attributes of the determined cluster of the plurality of content providers.

12. A computer program product for processing a search query, the computer program product comprising one or more computer readable storage media having program instructions collectively stored on the one or more computer readable storage media, the program instructions executable by at least one processor to cause the at least one processor to:
cluster a plurality of content providers based on attributes of the plurality of content providers to produce a plurality of clusters, wherein
each cluster of the plurality of clusters has one or more content providers of the plurality of content providers, and
the one or more content providers have aligned attributes of the attributes;
predict, for each cluster of the plurality of clusters, a time interval for which an impact of a review of the one or more content providers remains active, wherein
the time interval is predicted based on historical data including changes to cluster reliability of a respective cluster of the plurality of clusters from events influencing the attributes of the one or more content providers;
determine, a correlation strength, for each cluster of the plurality of clusters, based on the predicted time interval of the respective cluster and an amount of change to cluster attributes of the respective cluster, wherein
the cluster attributes are changed based on the events, and
the determined correlation strength of the respective cluster indicates reliability of the respective cluster;
determine a correlation between a user profile and each cluster of the plurality of clusters, wherein
the correlation between the user profile and the respective cluster is determined based on the correlation strength of the respective cluster, attributes of the user profile, and the attributes of the one or more content providers of the respective cluster, and
the search query is provided by a user associated with the user profile;
determine a cluster from among the plurality of clusters based on the determined correlation; and
retrieve content satisfying the search query from the one or more content providers of the determined cluster.

13. The computer program product of claim 12, wherein the content includes reviews for a product or service, and the plurality of content providers includes reviewers of the product or service.

14. The computer program product of claim 13, wherein the attributes of the user profile include one or more from a group of trust, fairness, self-awareness, motivation, expertise, and an intent with respect to the product or service.

15. The computer program product of claim 13, wherein the program instructions further cause the at least one processor to:
generate one or more review questions for the reviewers of the determined cluster based on a change in the correlation between the user profile and the determined cluster.

16. The computer program product of claim 12, wherein the program instructions further cause the at least one processor to:
re-cluster the plurality of content providers based on reliability of the determined cluster and the correlation of the determined cluster with the user profile failing to satisfy corresponding thresholds.

17. The computer program product of claim 12, wherein the program instructions further cause the at least one processor to:
add the user profile to the determined cluster of the plurality of content providers based on a correlation of the attributes of the user profile to attributes of the determined cluster of the plurality of content providers.

* * * * *